United States Patent
Beesley (10) Patent No.: US 11,279,228 B2
(45) Date of Patent: Mar. 22, 2022

(54) BI-STABLE LATCHING MECHANISM AND THE DRIVELINE RAPID DISCONNECT APPARATUS MADE THEREWITH

(71) Applicant: DANA AUTOMOTIVE SYSTEMS GROUP, LLC, Maumee, OH (US)

(72) Inventor: Peter A. Beesley, Fort Wayne, IN (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 16/630,888

(22) PCT Filed: Jul. 13, 2018

(86) PCT No.: PCT/US2018/041982
§ 371 (c)(1),
(2) Date: Jan. 14, 2020

(87) PCT Pub. No.: WO2019/014534
PCT Pub. Date: Jan. 17, 2019

(65) Prior Publication Data
US 2020/0223309 A1 Jul. 16, 2020

Related U.S. Application Data

(60) Provisional application No. 62/532,677, filed on Jul. 14, 2017.

(51) Int. Cl.
*F16D 11/14* (2006.01)
*B60K 17/02* (2006.01)
(Continued)

(52) U.S. Cl.
CPC .............. *B60K 17/02* (2013.01); *F16D 11/14* (2013.01); *F16D 21/00* (2013.01); *F16D 23/14* (2013.01);
(Continued)

(58) Field of Classification Search
CPC ......... B60K 17/02; F16D 11/14; F16D 21/00; F16D 23/14; F16D 28/00;
(Continued)

(56) References Cited

U.S. PATENT DOCUMENTS 4,244,455 A * 1/1981 Loker ..................... F16D 23/12
192/24
2013/0334001 A1* 12/2013 Albrecht ................. F16D 11/04
192/69.7
(Continued)

FOREIGN PATENT DOCUMENTS

DE 102013200716 A1 7/2014
WO 2017075180 A1 5/2017

OTHER PUBLICATIONS

ISA European Patent Office, International Search Report and Written Opinion Issued in Application No. PCT/US2018/041982, dated Sep. 28, 2018, WIPO, 9 pages.

Primary Examiner — David J Hlavka
(74) Attorney, Agent, or Firm — McCoy Russell LLP (57) ABSTRACT

An axle disconnect apparatus having a cam cylinder including a ramp disposed in a radially outer surface thereof. A first clutch element disposed at least partially inside the cam cylinder and an intermediate shaft disposed at least partially within the first clutch element. The intermediate shaft includes a splined portion in constant mesh with the first clutch element. A half shaft may be disposed coaxially with the intermediate shaft, and a second clutch element may be coupled with the half shaft. The first clutch element selectively engages the second clutch element. The axle disconnect apparatus further comprises a latching mechanism whereby the cam cylinder maintains an axial position. The latching mechanism including a radial depression in the cam
(Continued)

cylinder ramp, and a cam follower selectively disposed at least partially in the radial depression.

19 Claims, 12 Drawing Sheets

(51) Int. Cl.
    *F16D 21/00*     (2006.01)
    *F16D 23/14*     (2006.01)
    *F16D 28/00*     (2006.01)
    *F16H 25/18*     (2006.01)
    *F16H 53/02*     (2006.01)
    *F16H 53/06*     (2006.01)
    *F16D 23/12*     (2006.01)

(52) U.S. Cl.
    CPC ............. *F16D 28/00* (2013.01); *F16H 25/18* (2013.01); *F16H 53/02* (2013.01); *F16H 53/06* (2013.01); *F16D 2023/123* (2013.01)

(58) Field of Classification Search
    CPC ......... F16D 2023/123; F16D 2011/006; F16D 11/04; F16H 25/18; F16H 53/02; F16H 53/06
    See application file for complete search history.

(56) References Cited

U.S. PATENT DOCUMENTS

| | | | |
|---|---|---|---|
| 2014/0190781 A1* | 7/2014 | Lawson | F16D 27/118 192/69.8 |
| 2017/0356509 A1* | 12/2017 | Kurth | F16D 15/00 |
| 2017/0368934 A1* | 12/2017 | Edelen | F16H 48/08 |
| 2018/0180109 A1* | 6/2018 | Ince | F16D 13/68 |
| 2018/0345785 A1* | 12/2018 | Beesley | B60K 23/0808 |

* cited by examiner

BI-STABLE LATCHING MECHANISM AND THE DRIVELINE RAPID DISCONNECT APPARATUS MADE THEREWITH

CROSS-REFERENCE TO RELATED APPLICATION

The present application claims the benefit of U.S. Provisional Patent Application No. 62/532,677 filed on Jul. 14, 2017, which is fully incorporated by reference herein.

BACKGROUND

The present disclosure relates to a vehicle driveline; particularly to a driveline rapid disconnect apparatus. In an all-wheel drive ("AWD") vehicle, a primary wheel-set may be continually connected to the vehicle's power source while a secondary wheel-set is selectively connected to the vehicle's power source via a disconnect apparatus.

Traditionally, an AWD vehicle was disadvantaged by lower fuel efficiency, as compared to two-wheel-drive vehicles. Even when the secondary wheel-set was not drivingly engaged with the power source, traditional drivelines required continuous rotation of a secondary drive axle at road speed. Consequently, traditional AWD vehicles would lose energy and experience decreased fuel efficiency as compared to vehicles having only a single drive axle.

Typical disconnect apparatuses are utilized to disconnect many of the driveline components of the secondary wheel-set, thereby improving the fuel efficiency of the AWD vehicle. However, typical driveline apparatuses are deficient in their ability to rapidly connect and disconnect the driveline components of the secondary wheel-set.

The disclosure herein describes an apparatus and system that efficiently connects and disconnects the components of a secondary driveline.

SUMMARY

In one form, the present disclosure provides for an axle disconnect apparatus having a cam cylinder including a ramp disposed in a radially outer surface thereof. A first clutch element is disposed at least partially inside the cam cylinder, and an intermediate shaft is disposed at least partially within the first clutch element. The intermediate shaft includes a splined portion in constant mesh with the first clutch element. A half shaft is disposed coaxially with the intermediate shaft, and a second clutch element is coupled with the half shaft. The first clutch element is selectively engaged with the second clutch element. The axle disconnect apparatus further comprises a latching mechanism whereby the cam cylinder maintains an axial position. The latching mechanism includes a radial depression in the cam cylinder ramp, and a cam follower selectively disposed at least partially in the radial depression.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teaching of the present disclosure and do not illustrate all possible implementations thereof. The drawings are not intended to limit the scope of the present disclosure in any way.

DETAILED DESCRIPTION

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Certain embodiments of a rapid driveline axle disconnect apparatus 500 are utilized with an all-wheel-drive ("AWD") driveline assembly. However, the rapid disconnect apparatus 500 is not limited to use with the driveline assemblies described herein. The rapid disconnect apparatus 500 may be utilized with, but is not limited to, driveline assemblies of other shapes, sizes, orientations, and designs. Furthermore, it would be understood by one of ordinary skill in the art that these embodiments could have industrial, locomotive, military, and aerospace applications, as well as applications in consumer, electric, and autonomous or semi-autonomous vehicles.

Figure 1:
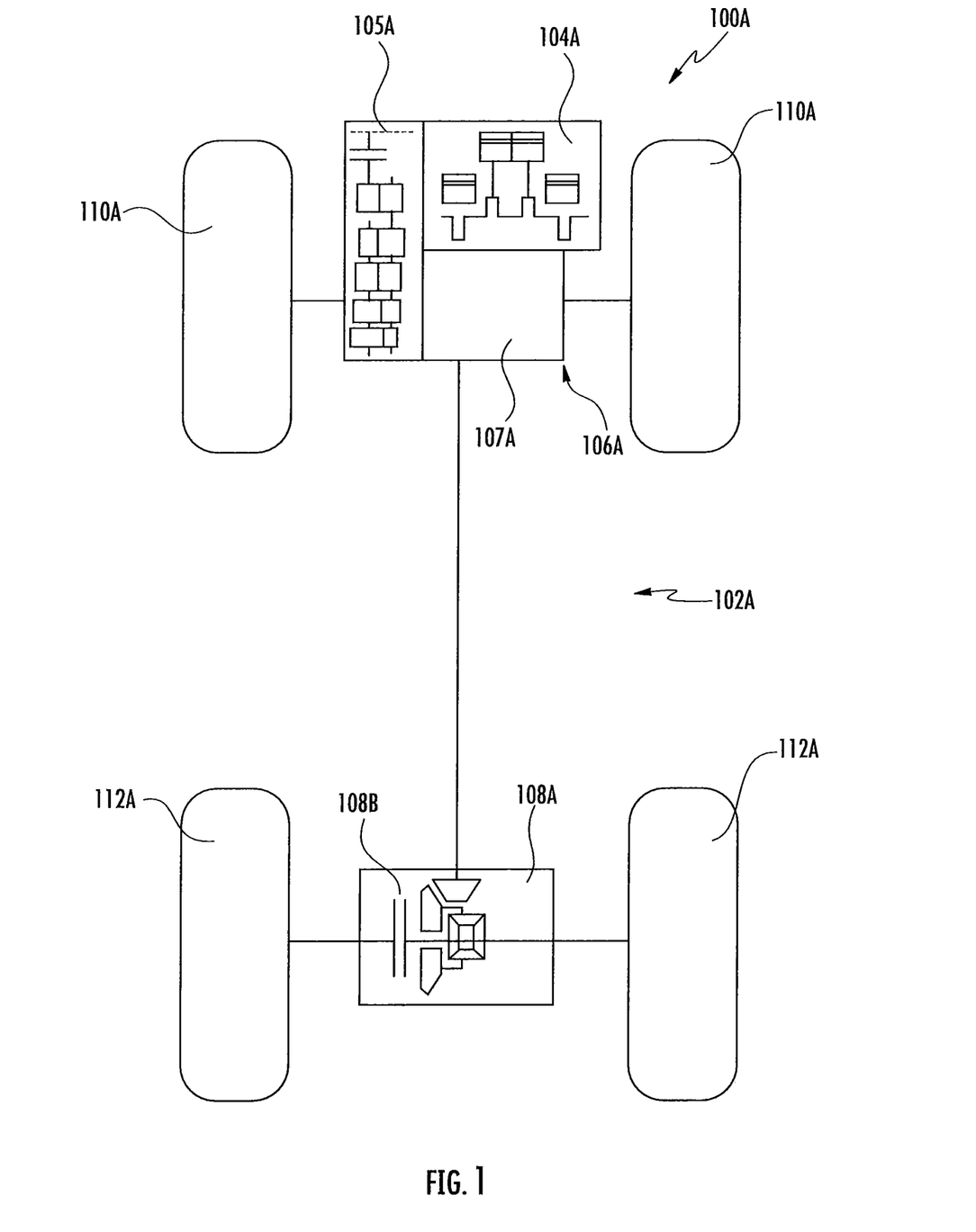
FIG. 1 illustrates a schematic diagram of an AWD vehicle driveline according to an embodiment of the presently disclosed subject matter.

In an embodiment, as illustrated in FIG. 1, the rapid disconnect apparatus 500 may be utilized in an AWD vehicle 100A having a driveline arrangement 102A with a transverse power source 104A. The power source 104A may be, but is not limited to, an internal combustion engine or an electric motor. In addition, the driveline arrangement 102A may include a transmission 105A having an input driveably connected to the power source 104A and an output driveably connected to a differential mechanism 107A. The differential mechanism 107A is driveably connected to a primary wheel-set 110A. The driveline arrangement 102A may also include a power transfer unit 106A driveably connected to the transmission 105A output, and selectively driveably connected to a secondary wheel-set 112A. The power transfer unit 106A may further comprise the rapid disconnect apparatus 500. When utilized in conjunction with a clutch 108B in a rear drive unit 108A the rapid disconnect apparatus 500 provides improved fuel economy by disconnecting AWD driveline components when AWD functionality is not required.

Figure 2:
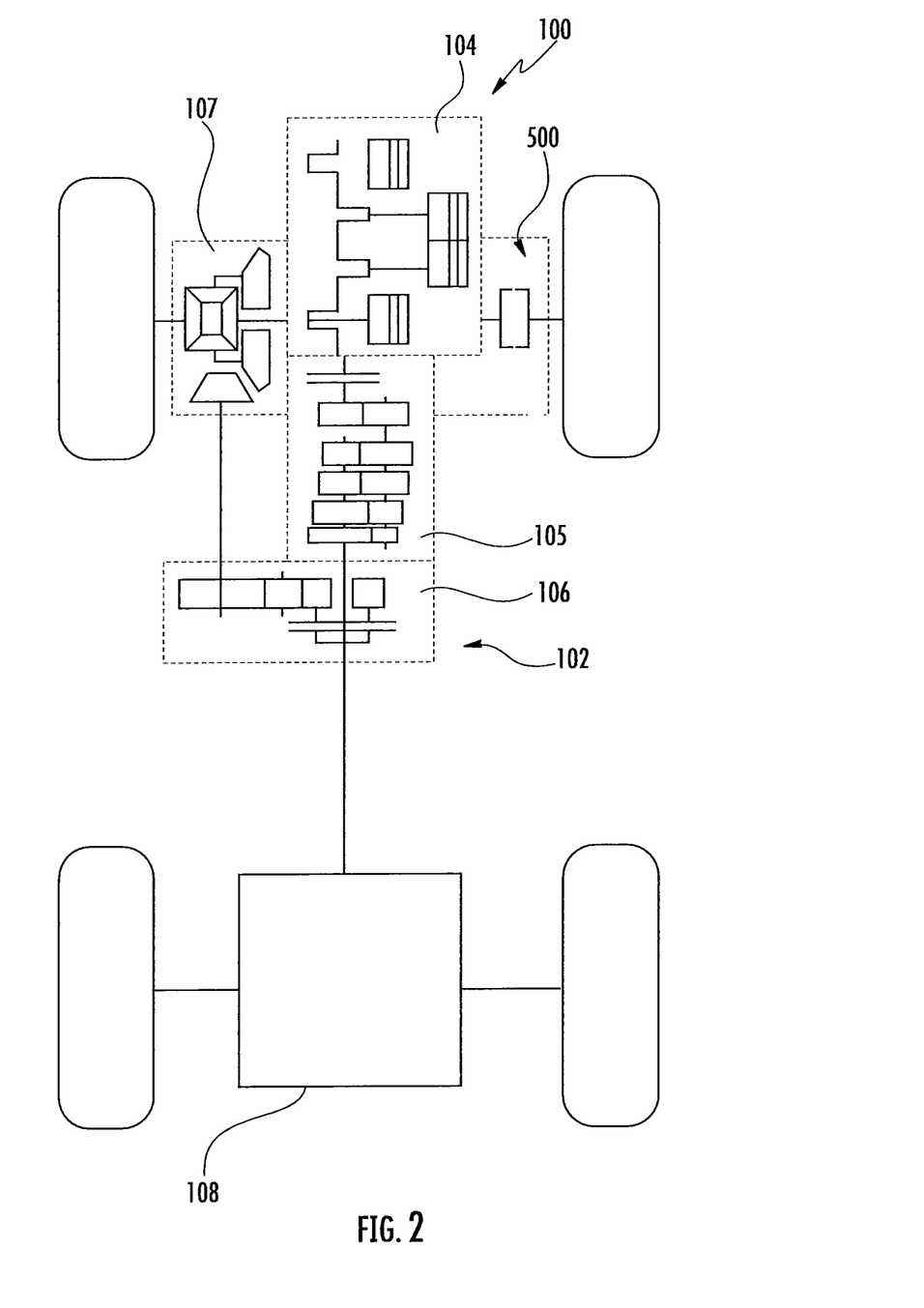
FIG. 2 illustrates a schematic diagram of an AWD vehicle driveline according to another embodiment of the presently disclosed subject matter.

As illustrated in FIG. 2, in another embodiment, the rapid disconnect apparatus 500 may be utilized in an AWD vehicle 100 having a driveline arrangement 102 with a longitudinal power source 104. In this embodiment, the rapid disconnect apparatus 500 may also be referred to as a front axle disconnect. The power source 104 may be, but is not limited to, an internal combustion engine or an electric motor. The driveline arrangement 102 may also include a transmission 105 having an input driveably connected to the power source 104 and an output driveably connected to a transfer case 106. The transfer case 106 including an output continuously driveably connected to a rear drive unit 108 and a second output selectively driveably connected to a front drive unit 107. The front drive unit 107 comprising a differential mechanism which is driveably connected to a primary wheel-set and the rapid disconnect apparatus 500. When utilized in conjunction with a clutch in the transfer case 106 the rapid disconnect apparatus 500 provides improved fuel economy by disconnecting AWD driveline components when AWD functionality is not required.

Figure 3:
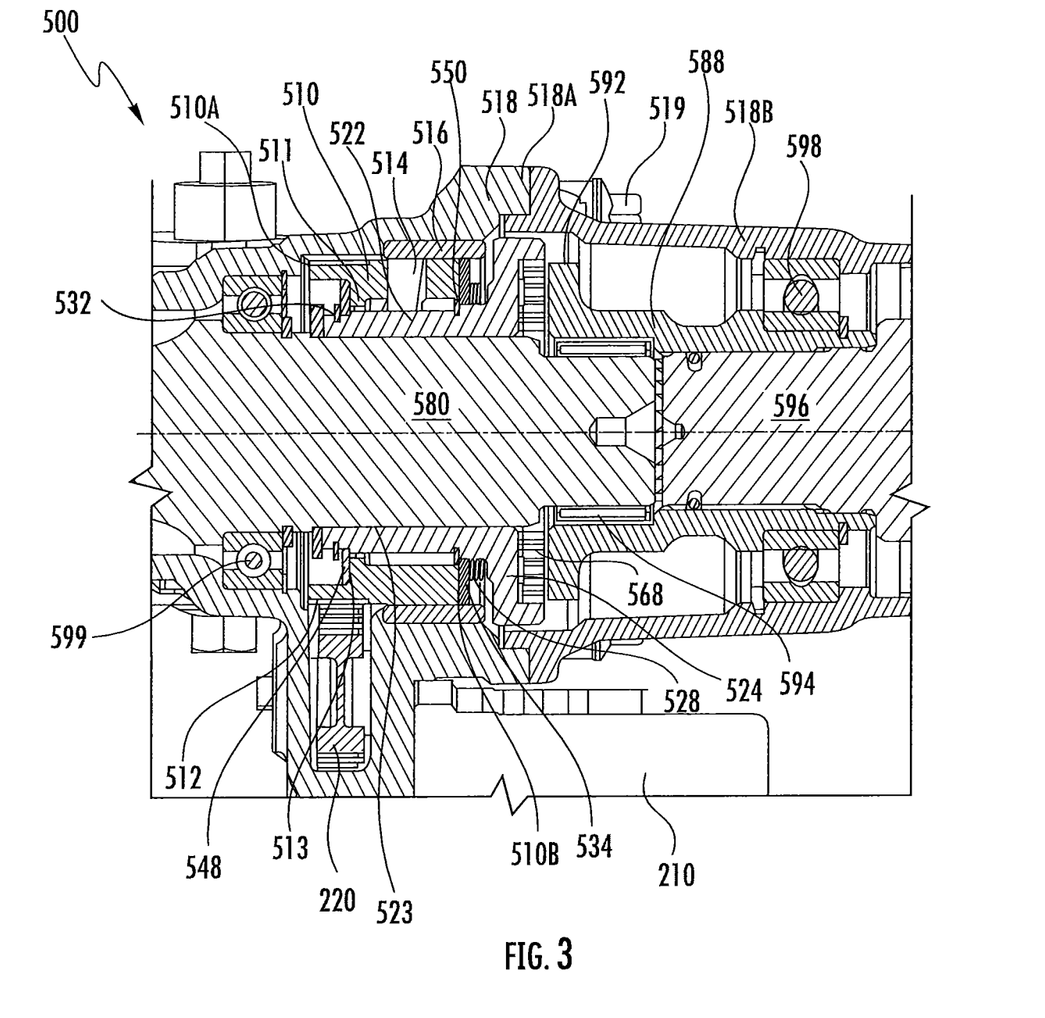
FIG. 3 illustrates a cross-sectional view of a portion of a driveline rapid disconnect apparatus according to an embodiment of the presently disclosed subject matter.
Figure 4:
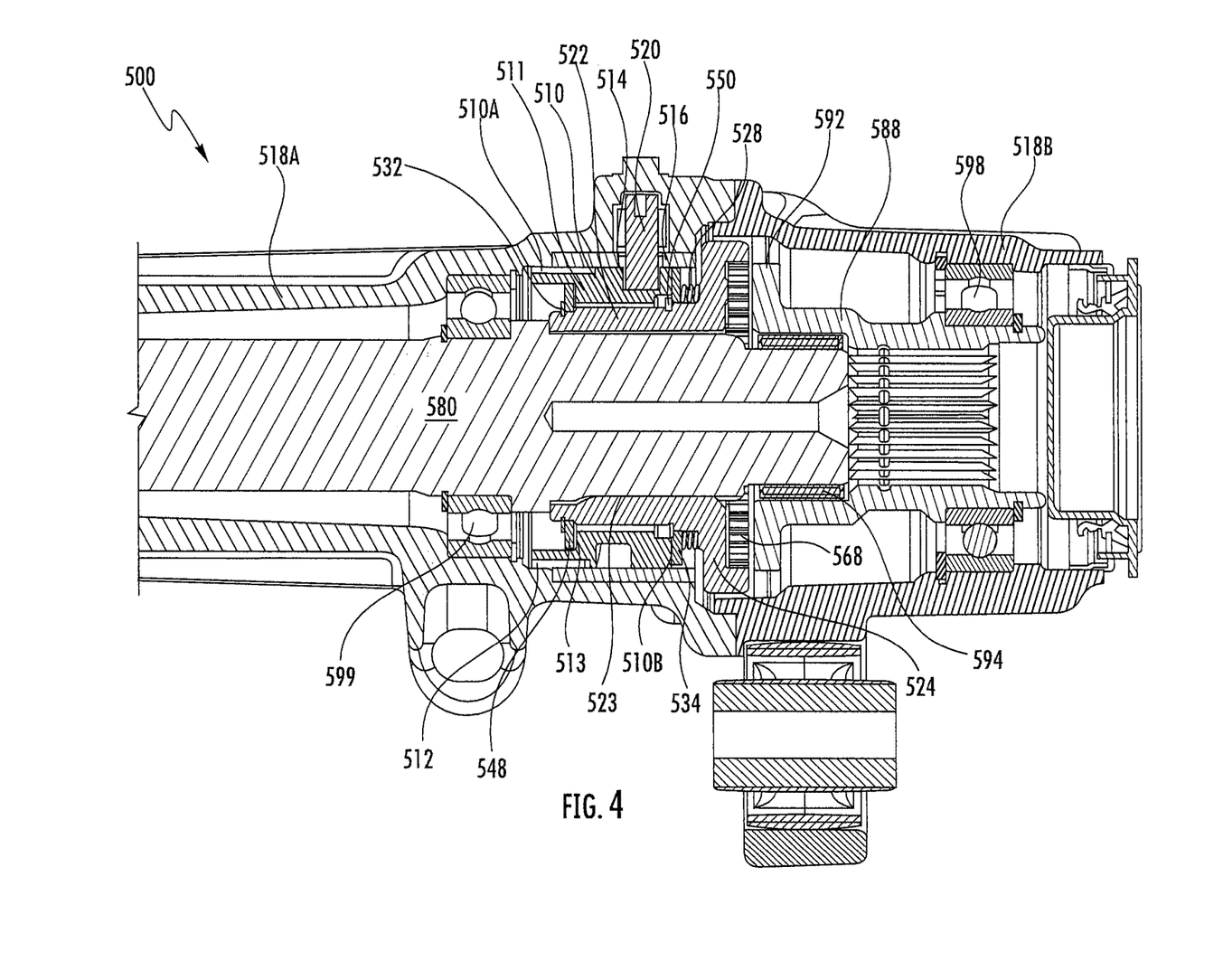
FIG. 4 illustrates a cross-sectional view of a portion of the driveline rapid disconnect apparatus according to FIG. 3.

In an embodiment, as illustrated in FIGS. 3 and 4, a rapid disconnect apparatus 500 includes a power source 210 drivingly connected with an idler gear 220. As illustrated in FIGS. 3 and 4, in an embodiment, the rapid disconnect apparatus 500 includes a high speed-low torque power source 210, such as, but not limited to, a brushless direct current electric (BLDC) motor. In an embodiment, the power source 210 may be a brushed direct current motor. The power source 210 may have an output shaft 212 (see FIG. 11) with a pinion (not depicted) coupled to an end thereof. The pinion is drivingly engaged with an idler gear 220, and the idler gear 220 is drivingly engaged with a plurality of splines 512 disposed on a cam cylinder 510. The idler gear 220 may also be referred to herein as a drive gear. In an embodiment, additional gears (not depicted) may be operatively connected between the power source 210 and the cam cylinder 510 to obtain a desired speed reduction ratio and/or to enable specific positioning of the power source 210. The power source 210 is drivingly engaged with the cam cylinder 510.

The cam cylinder splines 512 maintain constant engagement with the idler gear 220 while permitting linear actuation of the cam cylinder 510. As illustrated in FIG. 3, the cam cylinder 510 includes a ramp 514 disposed through a radial wall of the cam cylinder 510. In another embodiment, as illustrated in FIGS. 4-8 and 11-14, the cam ramp 514 may be disposed in the radially outer surface of the cam cylinder 510, but not extend completely through the cam cylinder 510 radial wall.

The cam cylinder 510 comprises a portion of a linear actuator. In an embodiment, the splines 512 may be disposed on the outer surface of a cam cylinder first end portion 510A. The axial distance traveled by the cam cylinder 510 may be determined by the ramp 514. The ramp 514 may comprise, but is not limited to, a single-stage-ramp. In certain embodiments, the ramp 514 may comprise multiple stages. The cam cylinder 510 may also comprise additional ramps (not depicted) to facilitate smooth rotation and linear actuation of the cam cylinder 510.

The cam cylinder 510 may be at least partially, concentrically, disposed within an annular bushing 516. The bushing 516 may itself be disposed concentrically within a housing 518. The housing 518 may comprise a first portion 518A and a second portion 518B coupled via a plurality of mechanical fasteners 519. In another embodiment, the first and second housing portions 518A, 518B may be coupled via welding.

As illustrated in FIGS. 3-6, a cam follower 520 may be rotatably coupled with the stationary housing 518 and slideably and rotatably disposed inside the cam cylinder ramp 514. Rotation of the cam cylinder 510 with the cam follower 520 inside the ramp 514 creates linear actuation of the cam cylinder 510. The cam follower 520 may comprise a bearing having an outer race fixedly coupled with the housing 518. The cam follower 520 may further comprise a pin having a first end coupled with an inner race of the bearing, and a second end disposed within the ramp 514. In an embodiment, as illustrated in FIG. 4, the cam follower 520 may comprise a needle bearing having an outer race fixedly connected to the housing 518. One end of the pin may be in direct contact with the needle bearing rollers, and the opposite end of the pin may be disposed within the ramp 514.

Figure 5:
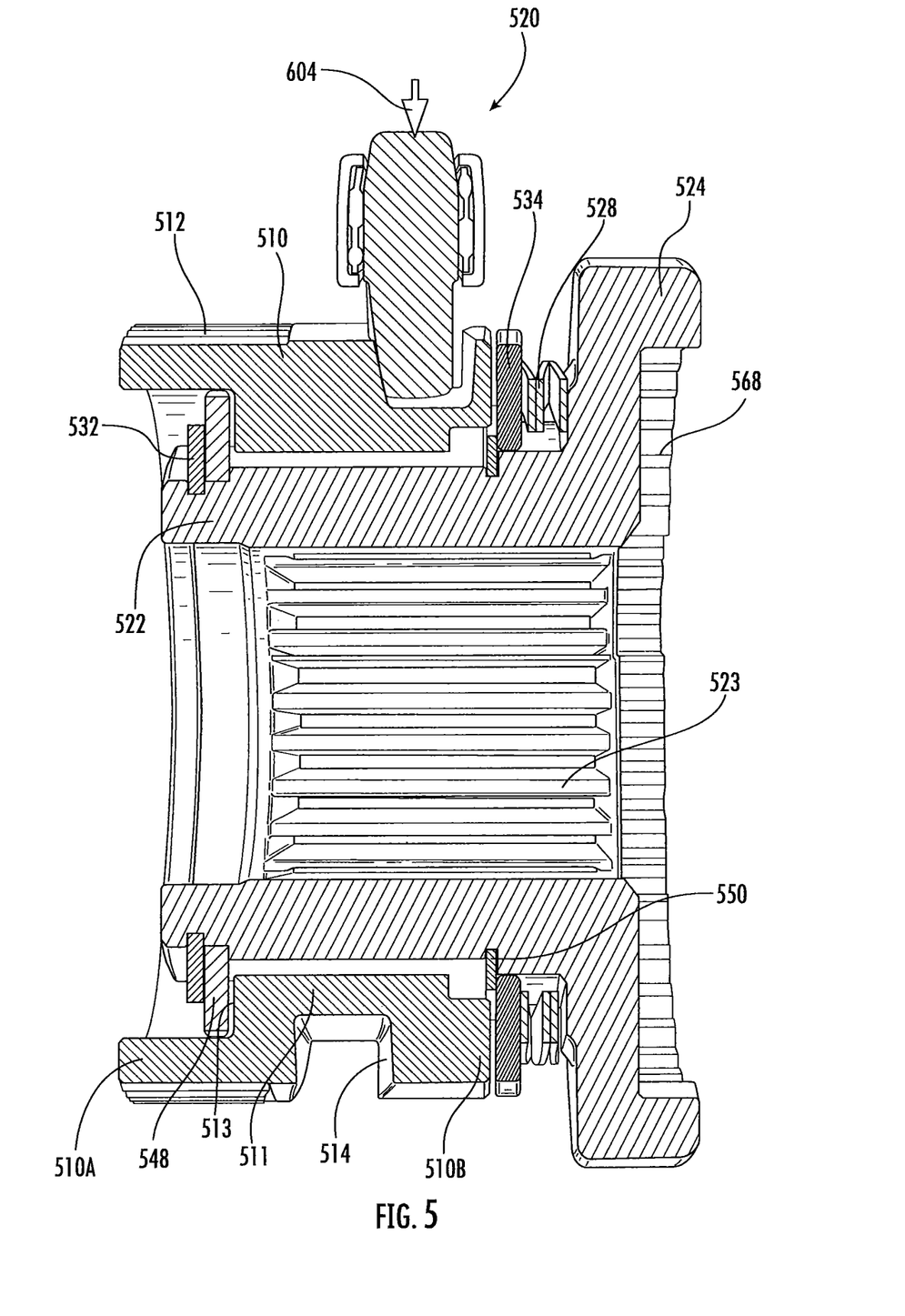
FIG. 5 illustrates a cross-sectional view of a portion of a driveline rapid disconnect apparatus according to FIG. 3.

In one embodiment, as illustrated in FIGS. 3-5, the rapid disconnect apparatus 500 comprises the cam cylinder 510 having first end 510A and a second end 510B. The cam cylinder second end 510B abuts a first thrust washer 534. The first thrust washer 534 is slideably and concentrically disposed about an outer surface of a first clutch element 522. The cam cylinder 510 may also comprise a radially-inward extending annular protrusion 511. The protrusion 511 defines a thrust surface 513. The thrust surface 513 abuts a second thrust washer 548 disposed concentrically and slideably on the outer surface of the first clutch element 522. Additionally, a first snap ring 532 is disposed in a groove in the outer surface of the first clutch element 522.

A biasing member 528 is disposed between the first thrust washer 534 and a dog clutch portion 524 of the first clutch element 522. The biasing member 528 may comprise a first end abutting the first thrust washer 534, and a second end abutting a thrust surface defined by the dog clutch portion 524. The biasing member 528 may be disposed concentrically about an exterior surface of the first clutch element 522. The biasing member 528 is continuously under at least some compression. At its most decompressed state, the biasing member 528 drives the first thrust washer 534 into contact with a second snap ring 550. The second snap ring 550 acts as a positive stop for the first thrust washer 534. When the biasing member 528 is at its most decompressed state, the cam cylinder thrust surface 513 abust the second thrust washer 548, and the second thrust washer 548 abuts the first snap ring 532. Persons having skill in the art will recognize the necessary tolerances between components to enable rotation of the cam cylinder 510 relative to the first clutch element 522.

The first clutch element 522 may comprise, but is not limited to, a unitary module including the dog clutch portion 524 and a generally cylindrical portion about which the cam cylinder 510 is coaxially disposed. The first clutch element 522 may further include a first inner diameter defining splines 523. An intermediate shaft 580 is coaxially disposed through the first clutch element 522. The intermediate shaft 580 may comprise splines 582 in constant engagement with the first clutch element inner splines 523.

The dog clutch portion 524 is generally cylindrical and comprises a second radially inner diameter of the first clutch element 522. The second inner diameter comprises radially-inward projecting splines 568. In another embodiment, the dog clutch portion splines 568 may instead be axially projecting teeth. The second inner diameter of the first clutch element 522 is greater than the first inner diameter (which defines the splines 523) of the first clutch element 522. The dog clutch portion splines 568 may also be referred to as inwardly projecting gear teeth.

The dog clutch portion splines 568 are selectively engaged with the splines 592 of a second clutch element 588. The second clutch element 588 may be an axially-stationary member disposed at least partially about an end of the intermediate shaft 580. A bearing 594, which may be, but is not limited to, a needle bearing, is located radially between a portion of the intermediate shaft 580 and the second clutch element 588. The second clutch element 588 is further disposed about and splined with an axle half shaft 596. The axle half shaft 596 may be rotationally supported in the housing 518B via a bearing 598. The intermediate shaft 580 may be supported within the housing 518A via a bearing 599.

In the embodiment as illustrated in FIGS. 3-5, utilizing only one biasing member 528 located about the first clutch element 522 removes a need for the cam cylinder 510 and the first clutch element 522 to hit a hard stop (e.g., a biasing member contacting a washer or snap ring to compress the biasing member) during a disconnect event of the first and second clutch elements 522, 588. Eliminating a hard stop disconnect reduces the risk of noise, vibration, and harshness ("NVH") in the rapid disconnect apparatus 500. Further, utilizing only the biasing member 528 facilitates a smaller axial profile of the cam cylinder 510, as compared to embodiments having a biasing member disposed between the snap ring 532 and the thrust washer 548.

Figure 6:
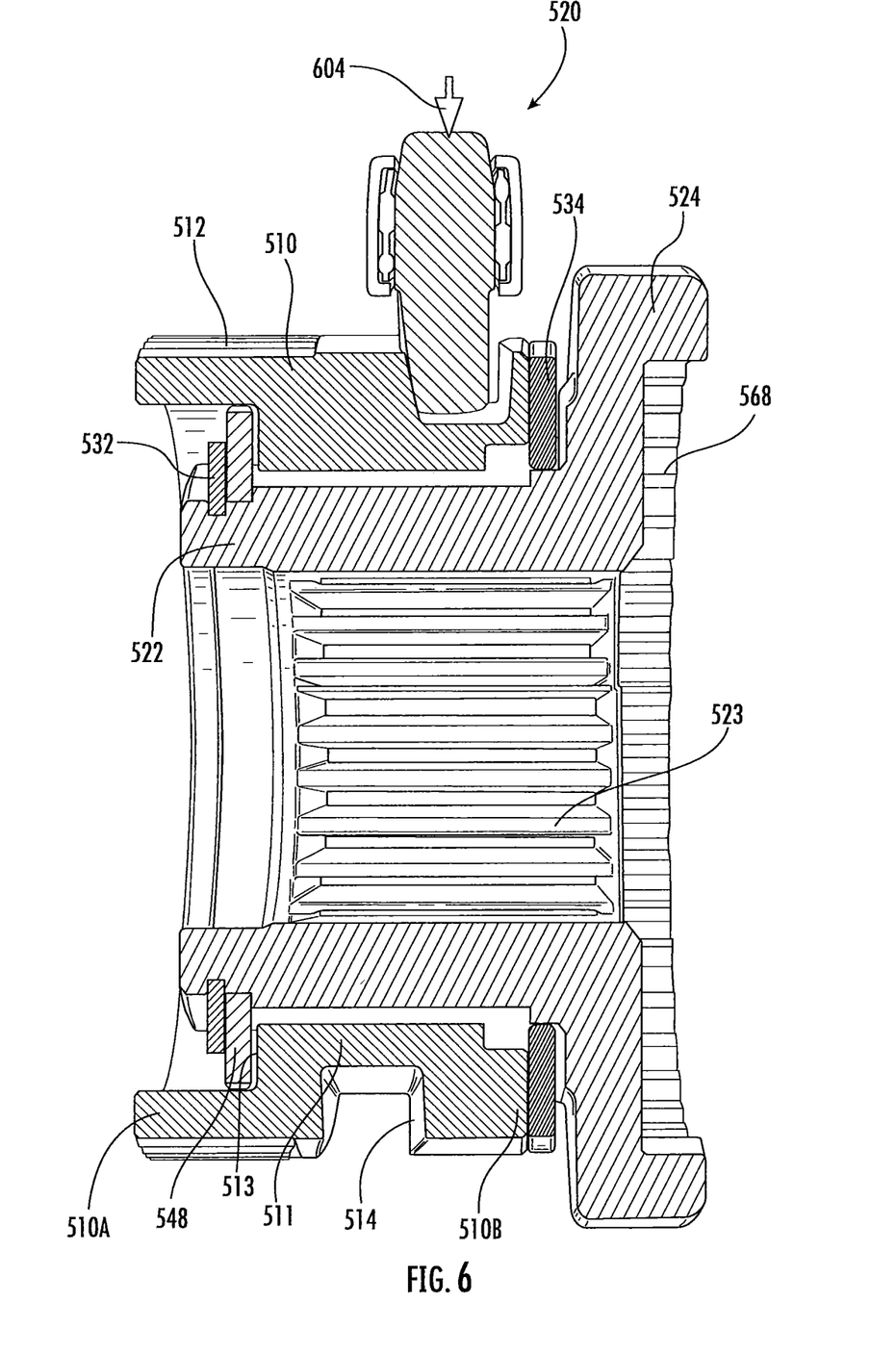
FIG. 6 illustrates a cross-sectional view of a portion of a driveline rapid disconnect apparatus according to another embodiment of the presently disclosed subject matter.

As illustrated in FIG. 6, in another embodiment, the rapid disconnect apparatus 500 does not include the biasing member 528 nor the second snap ring 550 disposed about the first clutch element 522. In this embodiment, there is no need for the cam cylinder 510 and the first clutch element 522 to hit a hard stop during a connect event of the first and second clutch elements 522, 588. Eliminating a hard stop during a connect event further reduces the risk of NVH in the rapid disconnect apparatus 500. In addition, removing the biasing member 528 and the snap ring 550 enables an even smaller axial profile of the cam cylinder 510.

In the embodiment illustrated in FIG. 6, to engage the first and second clutch elements 522, 588, the power source 210 drives the cam cylinder 510 in an axial direction. The cam cylinder 510 drives the first thrust washer 534, and the first thrust washer 534 exerts an axially driving force on the first clutch element 522.

Figure 7:
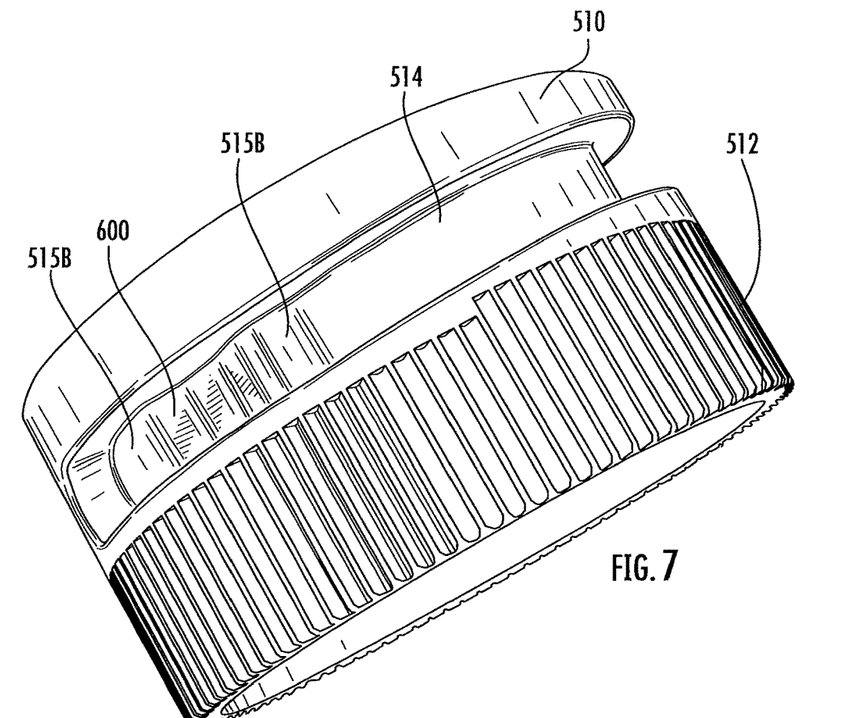
FIG. 7 illustrates a perspective view of a portion of a driveline rapid disconnect apparatus according to an embodiment of the presently disclosed subject matter.
Figure 8:
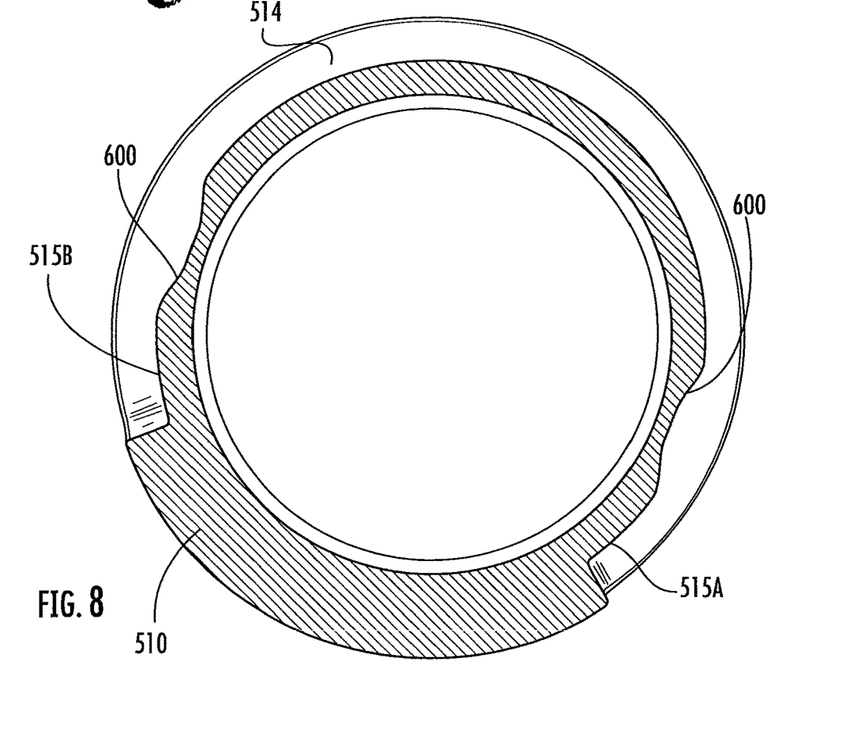
FIG. 8 illustrates a cross-sectional view of the portion of the driveline rapid disconnect apparatus according to FIG. 7.

As illustrated in FIGS. 7 and 8, the cam cylinder ramp 514 may have a first axial deceleration stage 515A, and/or a second axial deceleration stage 515B. In an embodiment, the deceleration stages 515A, 515B are disposed at each end of the ramp 514, respectively. The deceleration stages 515A, 515B may be disposed at an oblique angle to the ramp 514. The deceleration stage 515A allows the power source 210 to operate at a higher speed for a longer period of time. Operating the power source 210 at a higher speed for a longer period of time has the benefit of reducing the first and second clutch element 522, 588 engagement/disengagement time.

Figure 15:
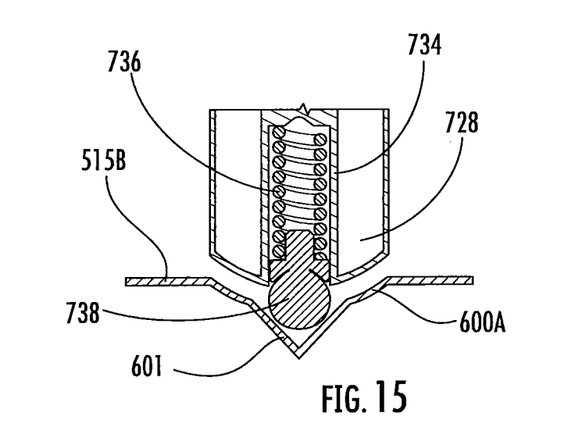
FIG. 15 illustrates a schematic view of a portion of the driveline rapid disconnect apparatus according to an embodiment of the presently disclosed subject matter.

In an embodiment, as illustrated in FIGS. 5-8 and 11-13, the rapid disconnect apparatus 500 may include a latching mechanism to prevent undesired disengagement of the first and second clutch elements 522, 588. As illustrated in FIGS. 5-8, the latching mechanism may comprise the cam cylinder ramp 514 and the cam follower 520. The cam cylinder ramp 514 comprises a radially descending latch ramp 600 disposed at each end thereof. The latch ramp 600 creates a "V-shape" or "U-shape" geometry when viewed in cross-section. In other words, the latch ramp 600 may comprise a radially descending ramp and a radially ascending ramp disposed adjacent thereto. The latch ramp 600 may also be referred to herein as a radial depression in said cam cylinder ramp 514. In an embodiment, as illustrated in FIG. 15, an additional notch 601 may be disposed at the bottom of the latch ramp 600 for further locating the cam follower 520. The pin of the cam follower 520 may comprise a rounded lower portion disposed in the ramp 514. In an embodiment, the lower portion of the cam follower pin may comprise a conical geometry.

When the first clutch element 524 is in a fully disengaged state, system backdrive is prevented by the latching mechanism. A biasing member 604 is disposed between the housing 518 and the cam follower 520. After the cam cylinder 510 rotates such that the cam follower 520 is disposed in the deceleration stage 515A of the cam cylinder ramp 514, the biasing member 604 depresses the cam follower 520 pin into the latch ramp 600. Backdrive may produce rotation of the cam cylinder 510 which creates axial movement of the first clutch element 522. Axial movement of the cam cylinder 510 and the first clutch element 522 is resisted by the latching mechanism because the radial force exerted on the pin of the cam follower 520 by the backdrive is not sufficient to overcome the compressive force of the biasing member 604. Therefore, the cam follower 520 is retained in the latch ramp 600 until the cam cylinder 510 is rotated via the power source 210.

Backdrive is similarly prevented when the first clutch element 522 is in a fully engaged state. Further, because the latching mechanism secures the cam cylinder 510 and the first clutch element 522 in both an engaged and disengaged state, it is unnecessary for the power source 210 to provide power to the rapid disconnect apparatus 500 in a fully engaged or disengaged state.

Figure 11:
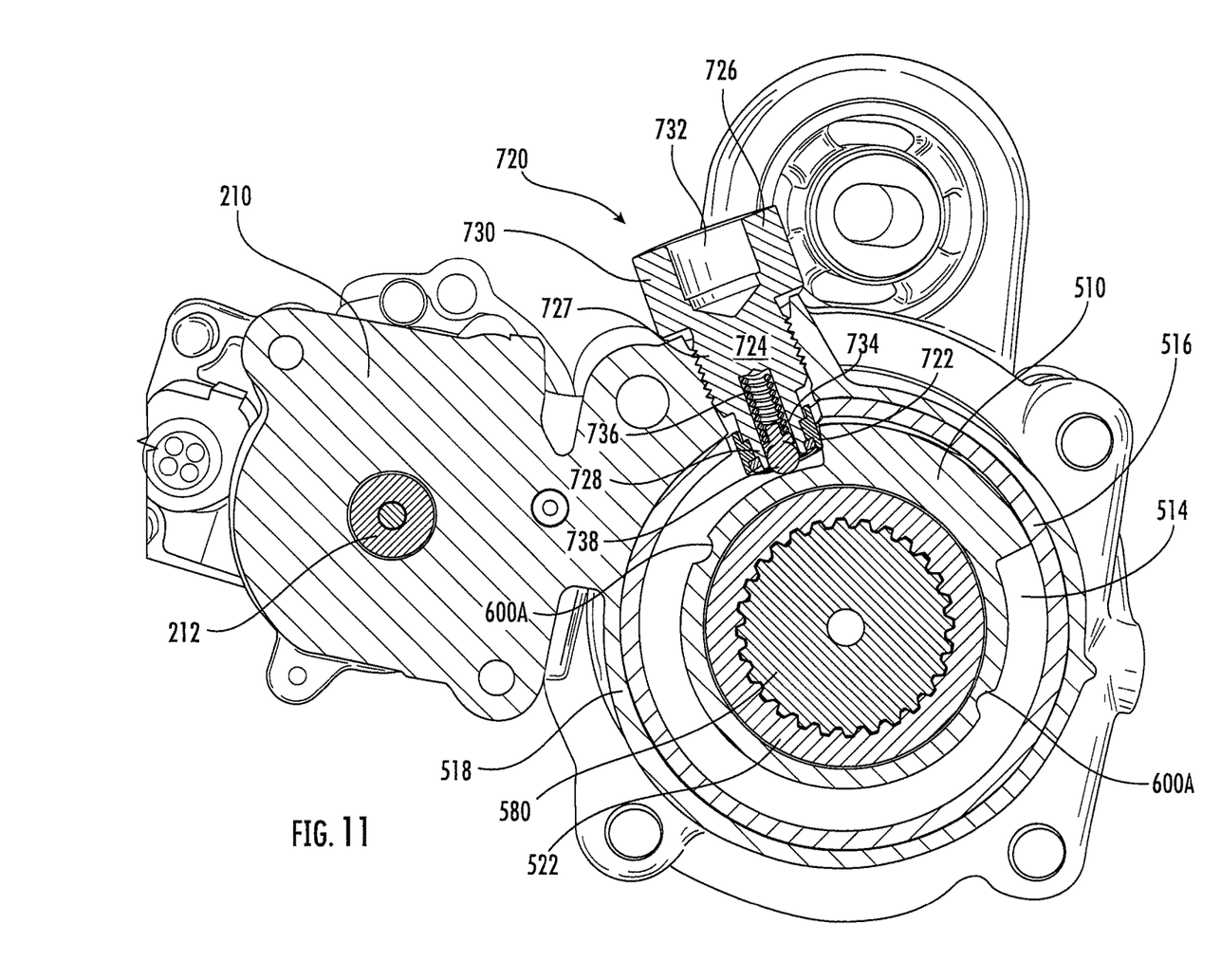
FIG. 11 illustrates a cross-sectional view of a portion of a driveline rapid disconnect apparatus according to another embodiment of the presently disclosed subject matter.
Figure 12:
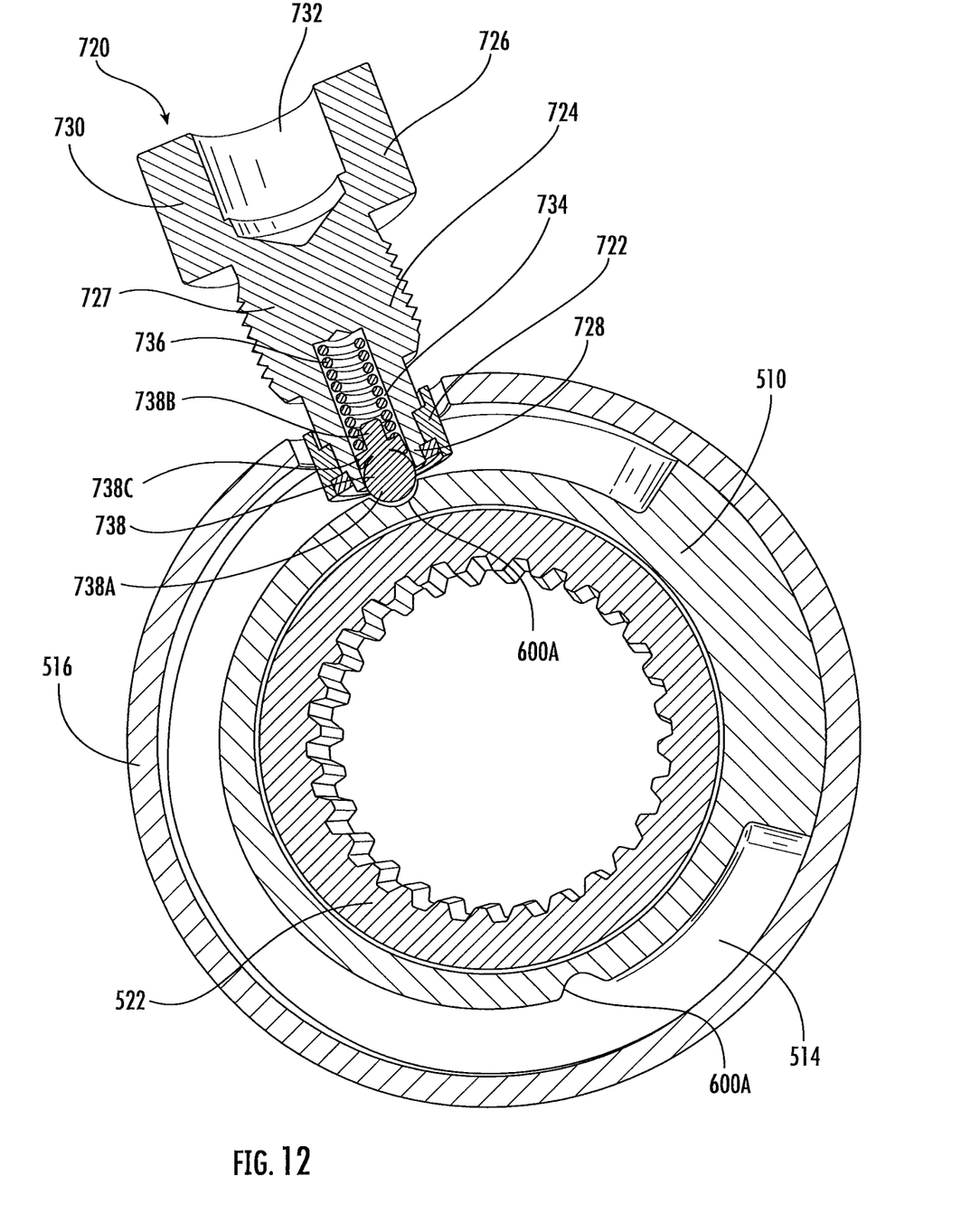
FIG. 12 illustrates a cross-sectional view of a portion of the driveline rapid disconnect apparatus according to FIG. 11, wherein a cam follower is in a latched position.
Figure 13:
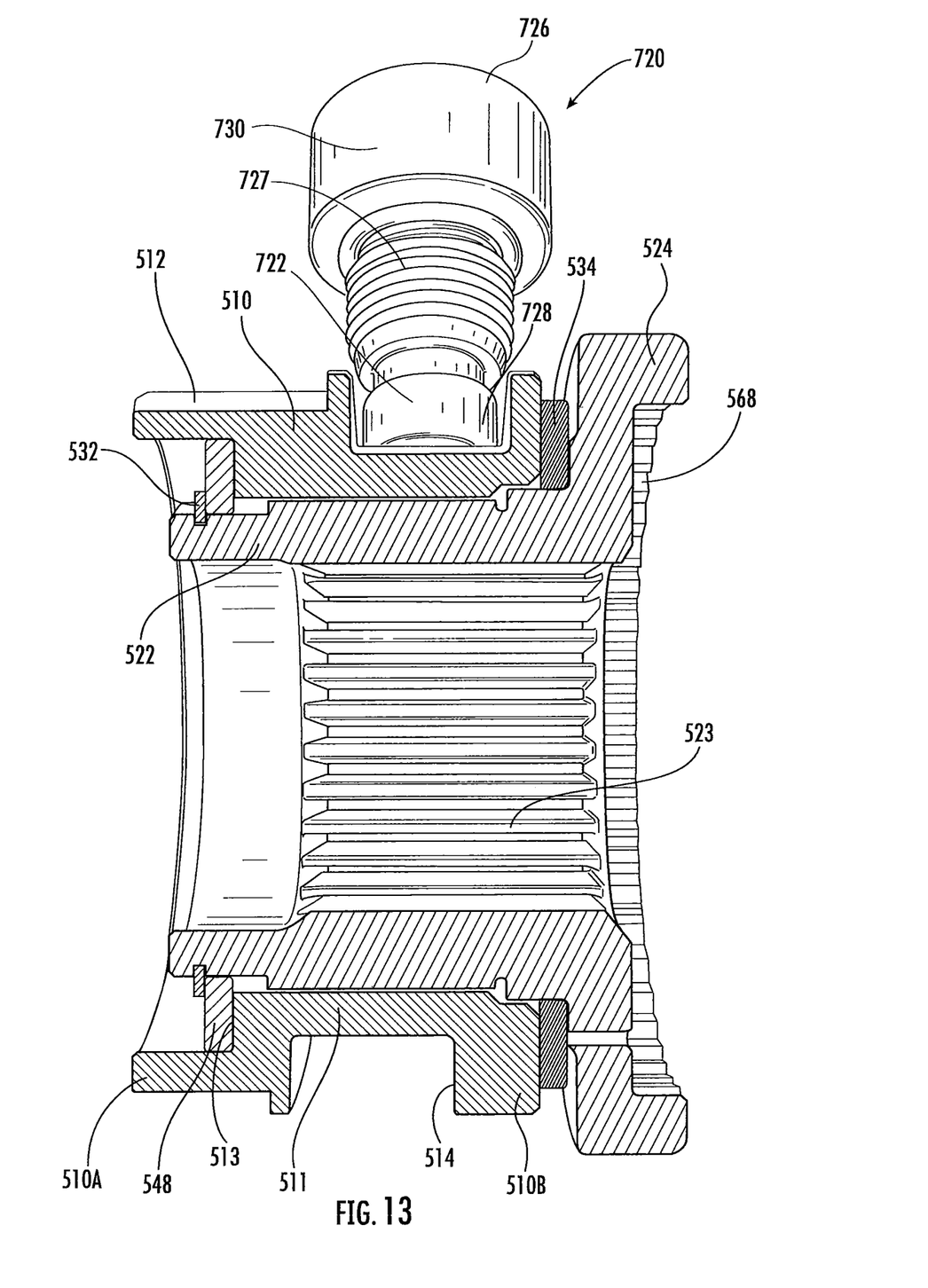
FIG. 13 illustrates another cross-sectional view of a portion of the driveline rapid disconnect apparatus according to FIG. 11.

In another embodiment, as illustrated in FIGS. 11-13, the latching mechanism of the rapid disconnect apparatus 500 may comprise a cam follower 720. The cam follower 720 may be non-rotatably coupled with the stationary housing 518 and slideably disposed inside the cam cylinder ramp 514. Rotation of the cam cylinder 510 with the cam follower 720 inside the ramp 514 creates linear actuation of the cam cylinder 510. The cam follower 720 may comprise a bearing 722 at least partially disposed within the cam cylinder ramp 514. An outer race of the bearing 722 may rotate within the cam cylinder ramp 514 as the cam follower 720 tracks within the cam cylinder ramp 514.

The cam follower 720 may further comprise a pin portion 724 having a first end 726, a body portion 727, and a second end 728. The pin portion first end 726 includes a head 730. The pin portion head 730 may comprise a, socket cap 732 for mating with an installation tool (not depicted). As illustrated in FIG. 11, the cam follower pin portion head 730 may be disposed at least partially exterior to the housing 518. The cam follower body portion 727 may define a threaded portion for engaging complimentary threads in the housing 518.

The bearing 722 may be coupled with the cam follower pin portion second end 728. Additionally, the pin portion second end 728 may include a generally cylindrical aperture 734 disposed coaxial with a longitudinal axis of the cam follower 720. The aperture 734 may extend at least partially the length of the cam follower 720. A biasing member 736 may be disposed within the cam follower pin aperture 734. In an embodiment, the biasing member 736 may comprise a coil spring. In other embodiments, the biasing member 736 may comprise, but is not limited to, a compression spring, a volute spring, or a polymer spring. A plunger 738 may also be at least partially disposed within the cam follower pin aperture 734. The biasing member 736 exerts a force on the plunger 738 in the direction of the pin portion second end 728.

In an embodiment, the cam follower plunger 738 may comprise a ball 738A. In an embodiment, the cam follower plunger 738 may also comprise a shaft 738B coupled with the ball 738A, where the shaft 738B is at least partially disposed within a coil spring biasing member 736. In an embodiment, a collar 738C may be disposed about the shaft 738B and located axially between the biasing member 736 and the ball 738A.

Figure 14:
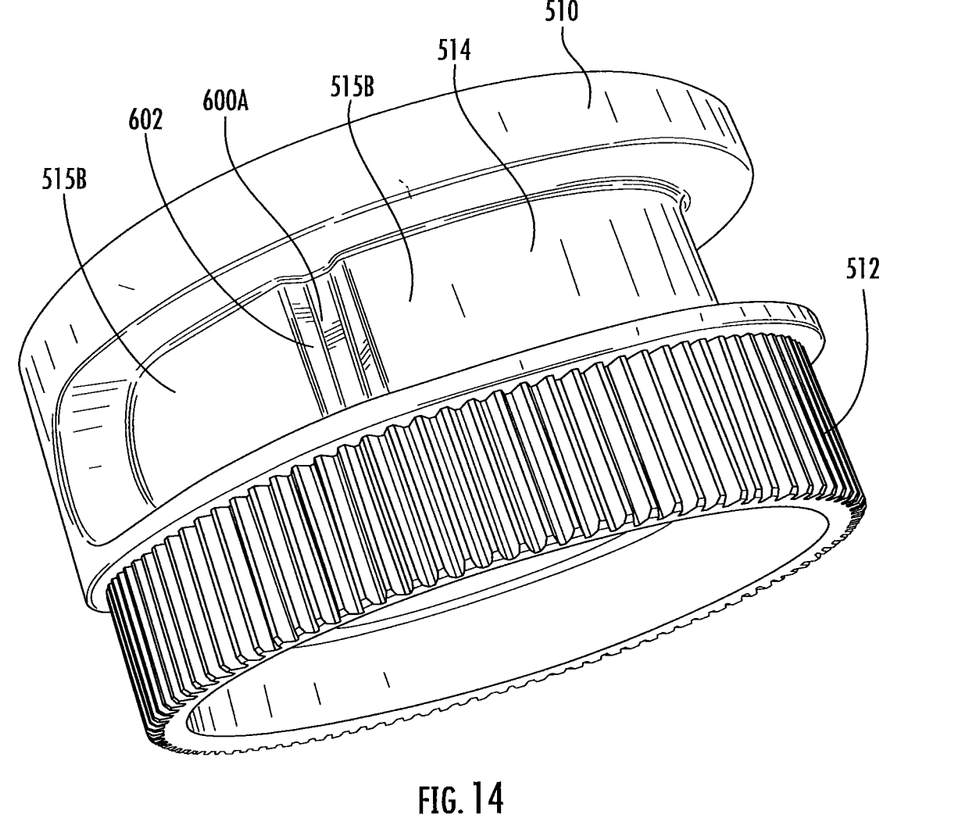
FIG. 14 illustrates a perspective view of a portion of the driveline rapid disconnect apparatus according to FIG. 11.

As illustrated in FIGS. 11, 12, and 14, in an embodiment, the cam cylinder 510 may comprise a latch ramp 600A. The latch ramp 600A may be narrower than the latch ramp 600, and have steeper radially extending ramp walls 602. In an embodiment, the latch ramp 600A may be suitable for use with the cam follower 720.

In operation, when the first clutch element 524 is in a fully disengaged state, system backdrive is prevented by the latching mechanism comprising the cam follower 720. After the cam cylinder 510 rotates such that the cam follower 720 is disposed in the axial deceleration stage 515A of the cam cylinder ramp 514, the cam follower biasing member 736 actuates the cam follower plunger 738 at least partially into the latch ramp 600A. Backdrive may produce rotation of the cam cylinder 510 which creates axial movement of the first clutch element 522. Axial movement of the cam cylinder 510 and the first clutch element 522 is resisted by the latching mechanism because the radial force exerted on the cam follower plunger 738 by the backdrive is not sufficient to overcome the compressive force of the cam follower biasing member 736. Therefore, the cam follower 720 is retained in the latch ramp 600A until the cam cylinder 510 is rotated via the power source 210.

With reference to FIG. 3-5, to connect the half shaft 596 to the driveline arrangement 102, 102A power path, the first clutch element 522 engages the second clutch element 588. To engage the first and second clutch elements 522, 588, the power source 210 drives the cam cylinder 510 into contact with the first thrust washer 534, the first thrust washer 534 drivingly engages the biasing member 528, and the biasing member 528 exerts an axially driving force to the first clutch element 522. In this embodiment, if the first clutch element dog clutch portion 524 cannot engage the second clutch element 588 because the clutch splines 523, 592 are blocking engagement, the power source 210 will drive the cam cylinder 510 toward the engaged position until the clutch splines 523, 592 are aligned and engage. The biasing member 528 may not be long enough to lock the cam cylinder 510 into the engaged position during a blocked clutch engagement. Therefore, the power source 210 may continuously drive the cam cylinder 510 toward engagement until the clutch teeth 568, 592 are aligned. Utilizing a shortened biasing member 528 provides the rapid disconnect apparatus 500 with a fast reaction time.

Figure 9:
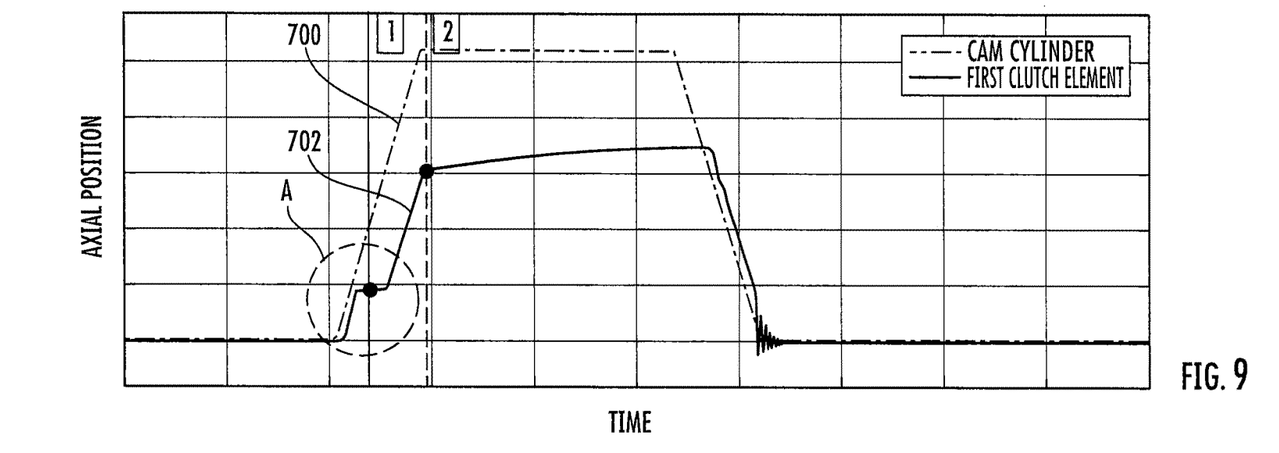
FIG. 9 is a graphical illustration of the engagement and disengagement of a driveline rapid disconnect apparatus according to an embodiment of the presently disclosed subject matter.

FIG. 9 graphically illustrates the engagement and disengagement of the first and second clutch elements 522, 588 according to the embodiment illustrated in FIGS. 3-5. Plot 700 depicts the axial position of the cam cylinder 510 over the time of an engagement and disengagement event. Plot 702 depicts the axial position of the first clutch element 522 over the time of an engagement and disengagement event. As illustrated at event A, compression of the biasing member 528 maintains the inertia of the motor 210 and the first clutch element 522, and creates a window (i.e., a period of time) for a change in the rotations per minute (RPM) of the first clutch element 522.

Figure 10:
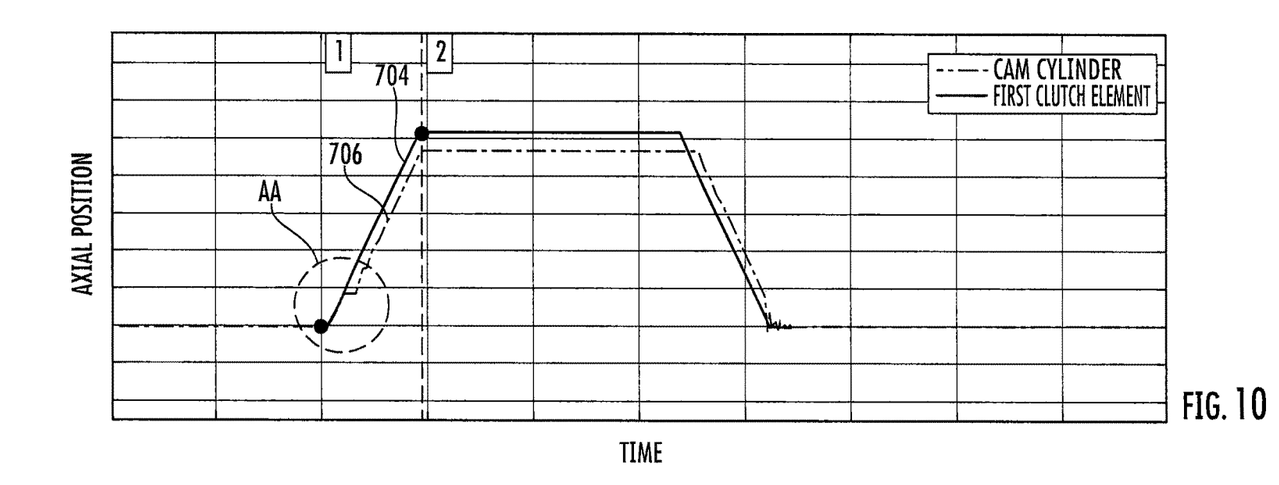
FIG. 10 is a graphical illustration of the engagement and disengagement of a driveline rapid disconnect apparatus according to another embodiment of the presently disclosed subject matter.

FIG. 10 graphically illustrates the engagement and disengagement of the first and second clutch elements 522, 588 according to the embodiment illustrated in FIG. 6. Plot 704 depicts the axial position of the cam cylinder 510 over the time of an engagement and disengagement event. Plot 706 depicts the axial position of the first clutch element 522 over the time of an engagement and disengagement event. As illustrated at event AA, stack-up gaps caused by friction at the interface of the clutch teeth 568, 592 create a smaller window (i.e., period of time) for a change in the RPM of the first clutch element 522.

While various embodiments of the presently disclosed subject matter have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative, not restrictive.

What is claimed is:
1. An axle disconnect apparatus, comprising:
a cam cylinder having a ramp disposed in a radially outer surface thereof;
a first clutch element disposed at least partially inside said cam cylinder;
an intermediate shaft disposed at least partially within said first clutch element, wherein said intermediate shaft includes a splined portion in constant mesh with said first clutch element;
a half shaft disposed coaxially with said intermediate shaft;
a second clutch element coupled with said half shaft, wherein said first clutch element is selectively engaged with said second clutch element; and
a latching mechanism whereby said cam cylinder maintains an axial position, comprising:
a radial depression in said cam cylinder ramp; and
a cam follower selectively disposed at least partially in said radial depression, comprising:

a first end coupled with a housing;
a second end at least partially disposed within said cam cylinder ramp;
a bearing coupled with said cam follower second end, wherein said bearing is at least partially disposed within said cam cylinder ramp;
an aperture disposed in said cam follower second end, wherein said aperture is disposed coaxial with a longitudinal axis thereof;
a biasing member disposed within said aperture; and
a plunger at least partially disposed within said aperture, wherein said biasing member selectively actuates said plunger at least partially into said radial depression.

2. The axle disconnect apparatus according to claim 1, further comprising:
a biasing member disposed axially between an end of said cam cylinder and a portion of said first clutch element, wherein said cam cylinder selectively translates axially relative to said first clutch element.

3. The axle disconnect apparatus according to claim 1, wherein said cam cylinder further comprises:
a first axial deceleration stage disposed at a first end of said cam cylinder ramp; and
a second axial deceleration stage disposed at a second end of said cam cylinder ramp.

4. The axle disconnect apparatus according to claim 1, wherein said radial depression further comprises:
a radially descending ramp; and
a radially ascending ramp disposed adjacent to said radially descending ramp.

5. The axle disconnect apparatus according to claim 4, wherein:
said cam cylinder ramp comprises a width; and
said radially descending ramp and said radially ascending ramp extend the width of said cam cylinder ramp.

6. The axle disconnect apparatus according to claim 1, wherein said cam follower further comprises:
a bearing coupled with said cam follower first end whereby said cam follower may rotate relative to said housing; and
a biasing member disposed between said housing and a portion of said cam follower.

7. The axle disconnect apparatus according to claim 1, wherein:
said cam follower is disposed through said housing, whereby said cam follower first end is disposed radially exterior to said housing.

8. The axle disconnect apparatus according to claim 1, wherein:
said cam follower first end comprises a socket cap.

9. The axle disconnect apparatus according to claim 1, wherein said cam follower further comprises:
a body portion disposed axially between said first end and said second end, wherein said body portion comprises a threaded portion.

10. The axle disconnect apparatus according to claim 1, wherein said cam follower plunger further comprises a ball.

11. The axle disconnect apparatus according to claim 1, further comprising:
an electric motor drivingly engaged with said cam cylinder, wherein said electric motor does not transfer torque to said cam cylinder to maintain said cam follower in said radial depression.

12. The axle disconnect apparatus according to claim 1, wherein said latching mechanism further comprises:

a radially descending notch disposed within said radial depression.

13. An axle disconnect apparatus, comprising:
a cam cylinder having a ramp disposed in a radially outer surface thereof;
a first clutch element disposed at least partially inside said cam cylinder;
an intermediate shaft disposed at least partially within said first clutch element, wherein said intermediate shaft includes a splined portion in constant mesh with said first clutch element;
a half shaft disposed coaxially with said intermediate shaft;
a second clutch element coupled with said half shaft, wherein said first clutch element is selectively engaged with said second clutch element; and
a latching mechanism whereby said cam cylinder maintains an axial position, comprising:
a radial depression in said cam cylinder ramp; and
a cam follower selectively disposed at least partially in said radial depression,
wherein said cam cylinder ramp comprises a width;
wherein said radial depression comprises a radially descending ramp and a radially ascending ramp disposed adjacent to said radially descending ramp;
wherein said radially descending ramp and said radially ascending ramp extend the width of said cam cylinder ramp; and
wherein said cam cylinder further comprises a first axial deceleration stage disposed at a first end of said cam cylinder ramp, and a second axial deceleration stage disposed at a second end of said cam cylinder ramp.

14. The axle disconnect apparatus according to claim 13, further comprising:
a biasing member disposed axially between an end of said cam cylinder and a portion of said first clutch element, wherein said cam cylinder selectively translates axially relative to said first clutch element.

15. The axle disconnect apparatus according to claim 13, wherein said cam follower comprises:
a first end coupled with a housing;
a bearing coupled with said cam follower first end whereby said cam follower may rotate relative to said housing;
a second end at least partially disposed within said cam cylinder ramp; and
a biasing member disposed between said housing and a portion of said cam follower for pressing the cam follower into said radial depression.

16. An axle disconnect apparatus, comprising:
a cam cylinder having a ramp disposed in a radially outer surface thereof;
a first clutch element disposed at least partially inside said cam cylinder;
an intermediate shaft disposed at least partially within said first clutch element, wherein said intermediate shaft includes a splined portion in constant mesh with said first clutch element;
a half shaft disposed coaxially with said intermediate shaft;
a second clutch element coupled with said half shaft, wherein said first clutch element is selectively engaged with said second clutch element; and a latching mechanism whereby said cam cylinder maintains an axial position, comprising:
  a radial depression in said cam cylinder ramp; and
  a cam follower selectively disposed at least partially in said radial depression,
wherein said cam follower comprises a biasing member disposed between a housing and a portion of said cam follower for pressing the cam follower into said radial depression.

17. The axle disconnect apparatus according to claim 16, further comprising:
  a first biasing member disposed axially between an end of said cam cylinder and a portion of said first clutch element, wherein said cam cylinder selectively translates axially relative to said first clutch element.

18. The axle disconnect apparatus according to claim 16, wherein said cam follower further comprises:
  a first end coupled with a housing; and
  a second end at least partially disposed in said cam cylinder ramp.

19. The axle disconnect apparatus according to claim 16, wherein said cam cylinder ramp comprises a width;
  wherein said radial depression comprises a radially descending ramp and a radially ascending ramp disposed adjacent to said radially descending ramp; and
  wherein said radially descending ramp and said radially ascending ramp extend the width of said cam cylinder ramp.

* * * * *